United States Patent [19]

Gottlieb et al.

[11] 4,151,747
[45] May 1, 1979

[54] MONITORING ARRANGEMENT UTILIZING FIBER OPTICS

[75] Inventors: Milton Gottlieb; Gerald B. Brandt, both of Pittsburgh, Pa.

[73] Assignee: Electric Power Research Institute, Inc., Palo Alto, Calif.

[21] Appl. No.: 917,496

[22] Filed: Jun. 21, 1978

[51] Int. Cl.² .................................................. G01K 11/12
[52] U.S. Cl. ................................. 73/339 R; 73/356
[58] Field of Search ............... 73/356, 355 R, 339 R, 73/355 EM, 800, 363, 363.5; 356/43, 44

[56] References Cited
U.S. PATENT DOCUMENTS 3,051,038   8/1962   Duke ........................ 356/44
4,016,761   4/1977   Rozzell ..................... 73/356

Primary Examiner—Donald O. Woodiel
Attorney, Agent, or Firm—Flehr, Hohbach, Test, Albritton & Herbert

[57] ABSTRACT

An arrangement for monitoring a particular condition, specifically temperature in a preferred embodiment, is disclosed herein and includes a sensor in the form of at least one optical fiber. This optical fiber cooperates with a light source and detector for sensing changes in the temperature being monitored and is accomplished by selecting the fiber such that the amount of light which passes through it varies with changes in temperature.

18 Claims, 15 Drawing Figures

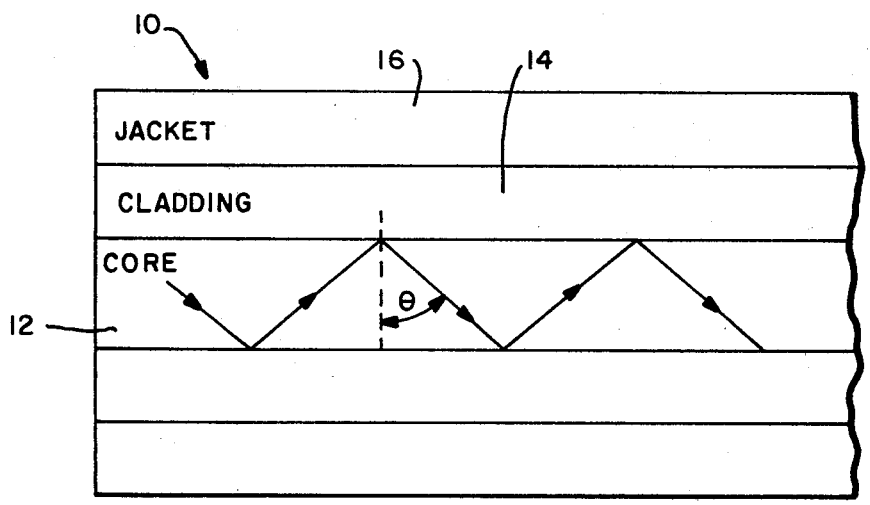
FIG.—1
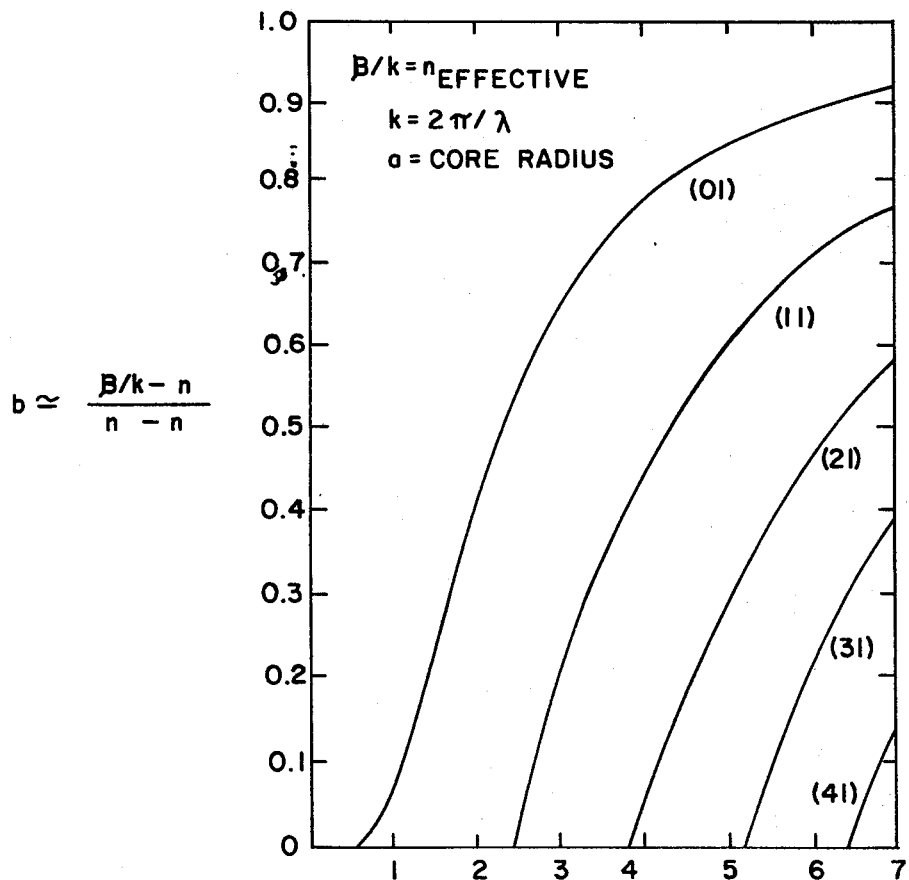
FIG.—2

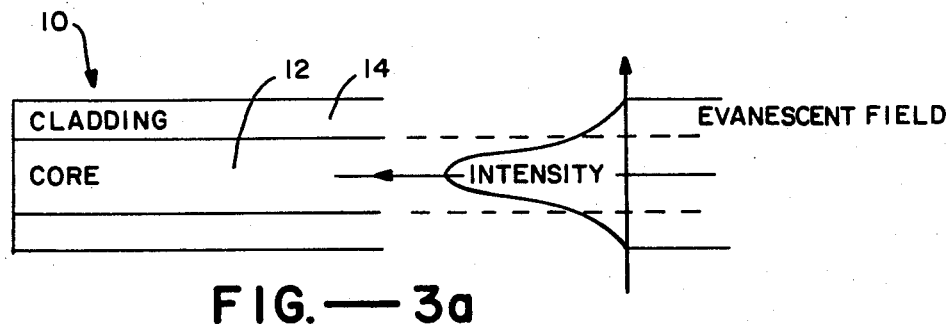
FIG.—3a
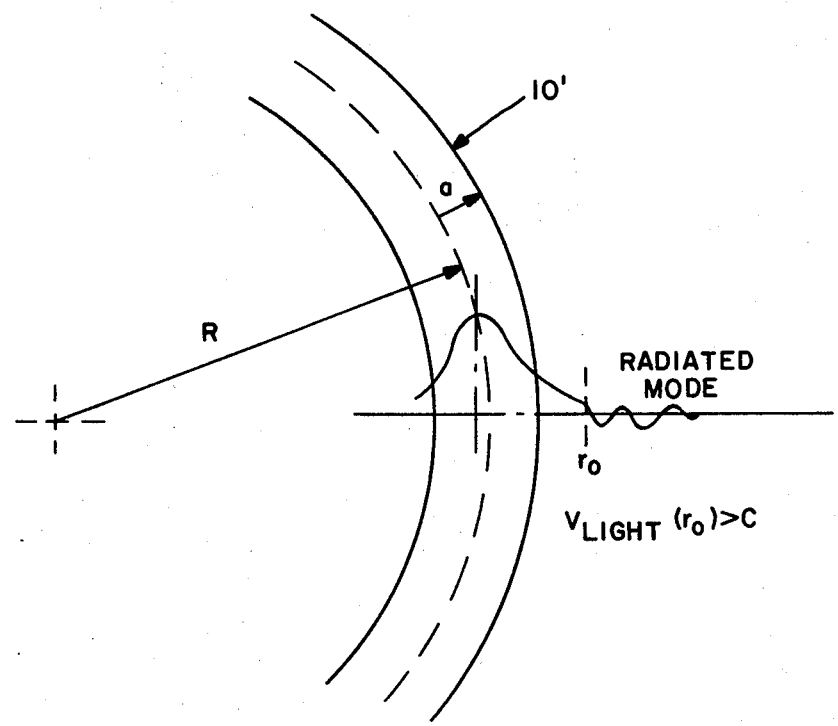
FIG.—3b
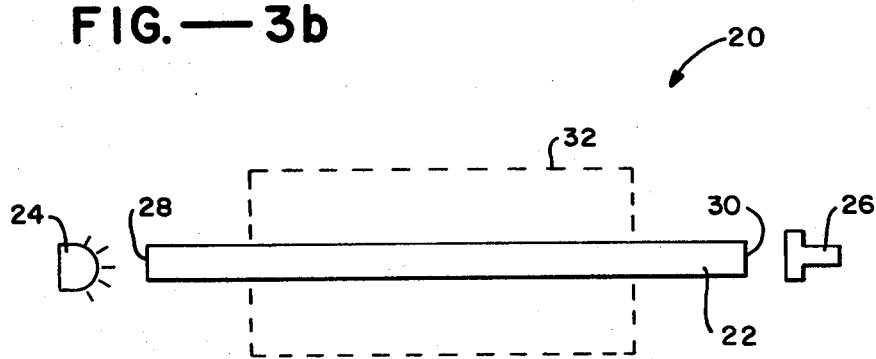
FIG.—4

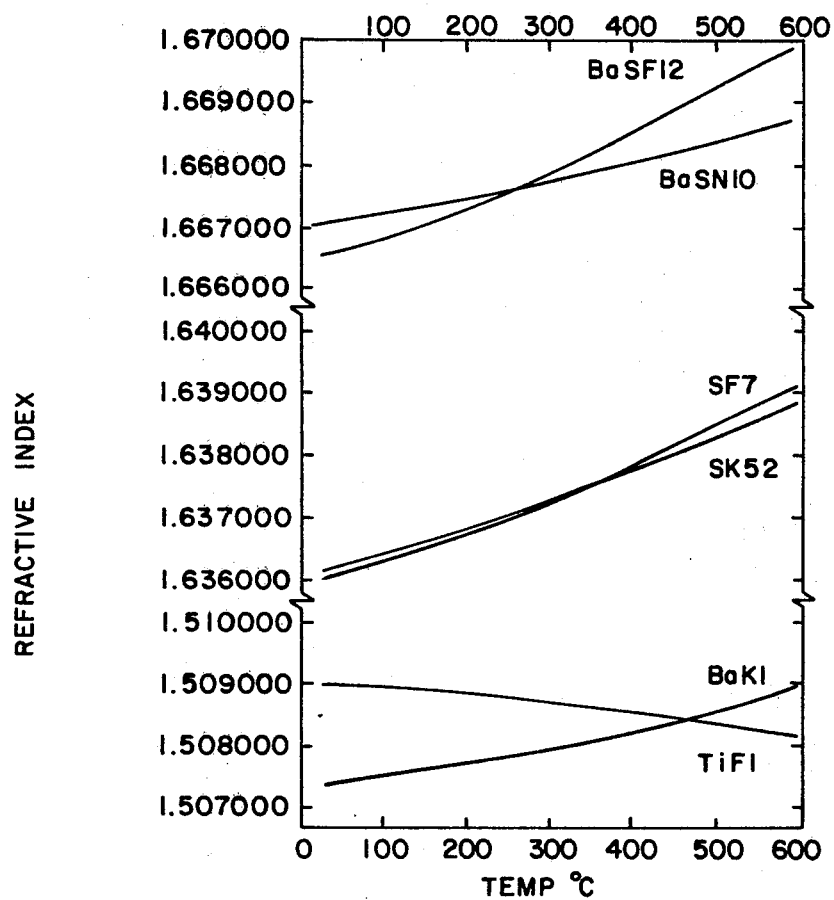
FIG.—5
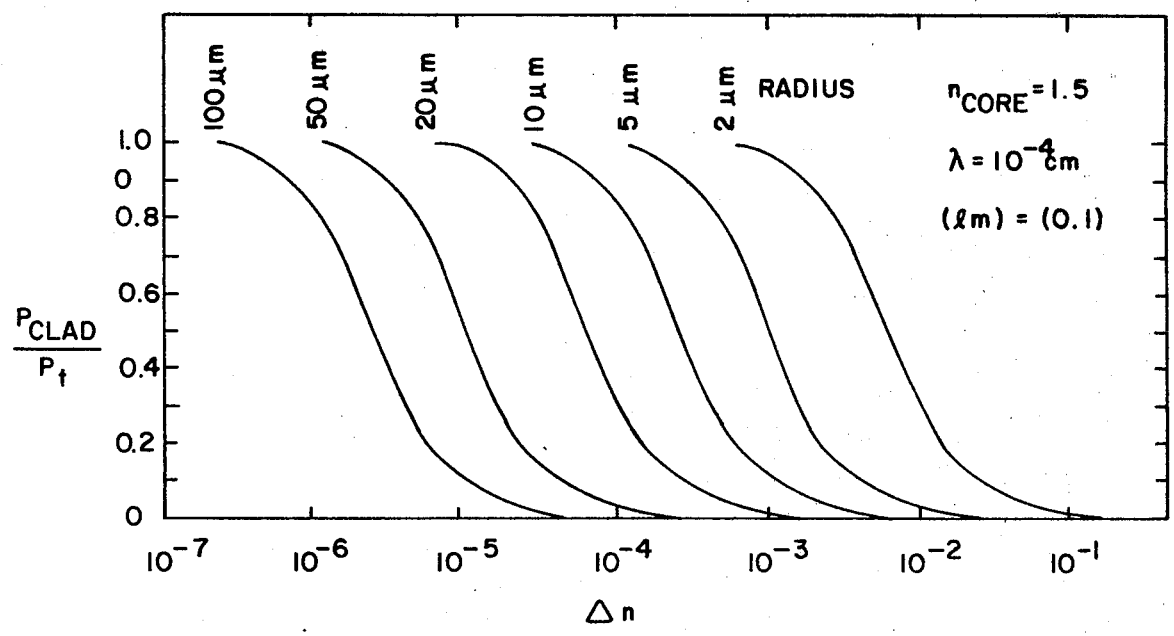
FIG.—6

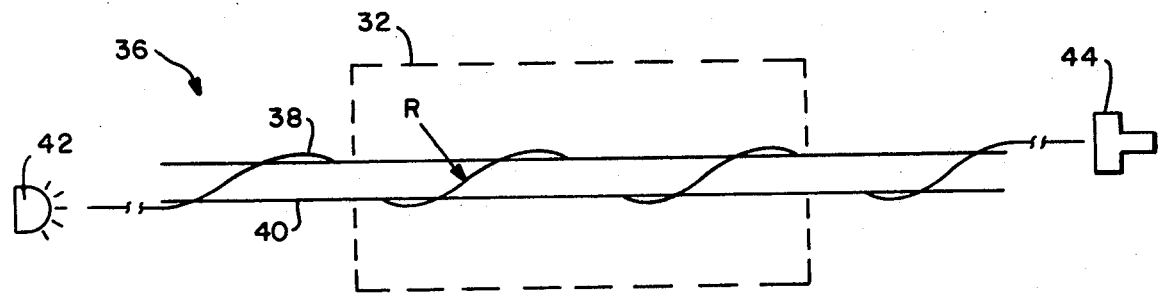
FIG.—7a
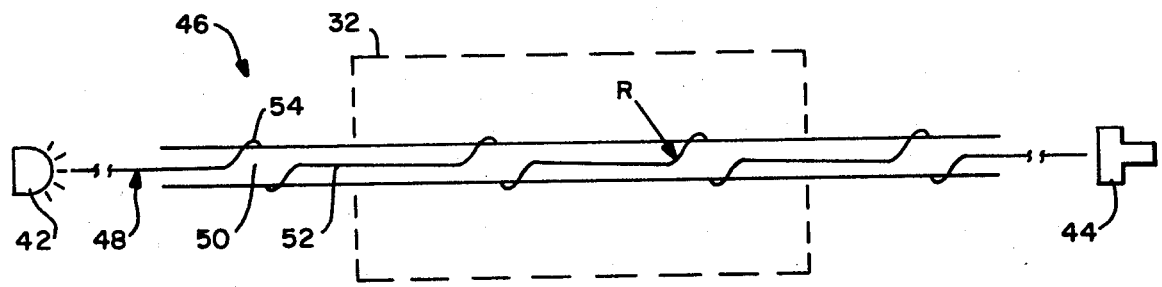
FIG.—7b
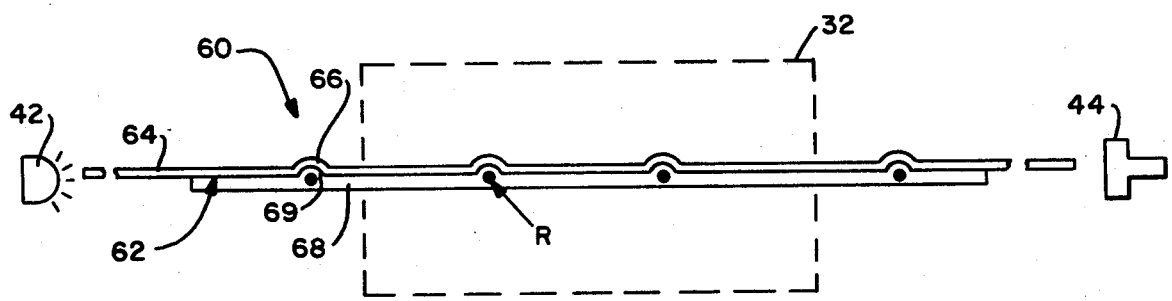
FIG.—7c
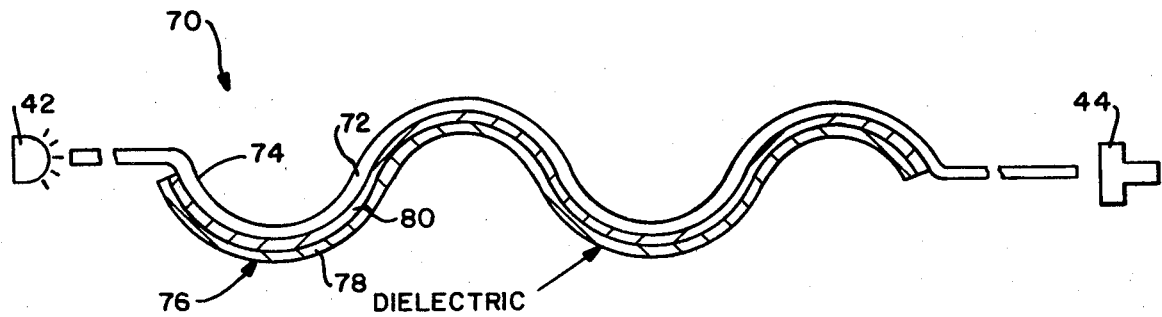
FIG.—8

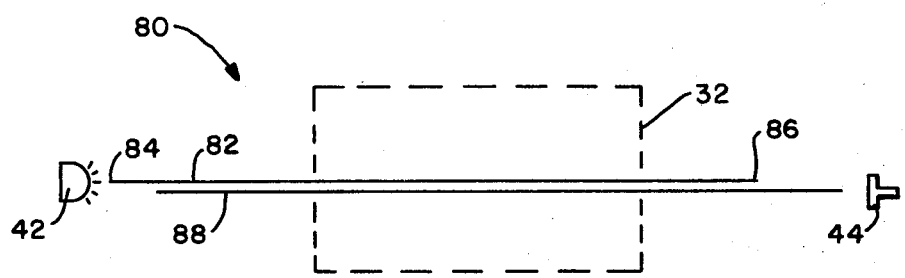
FIG.—9a
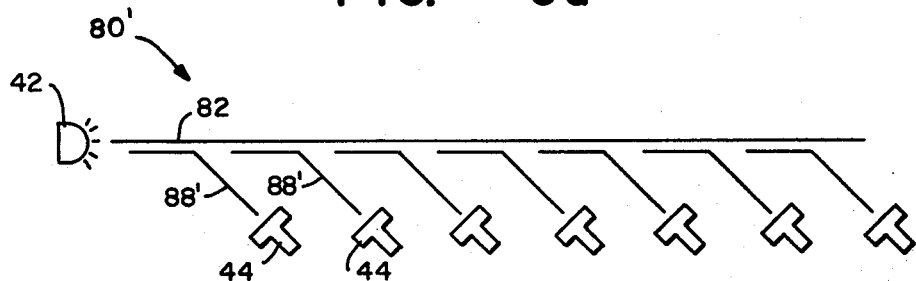
FIG.—9b
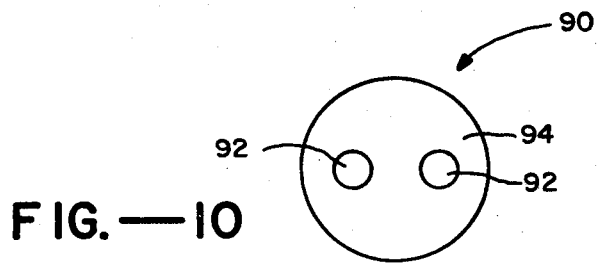
FIG.—10
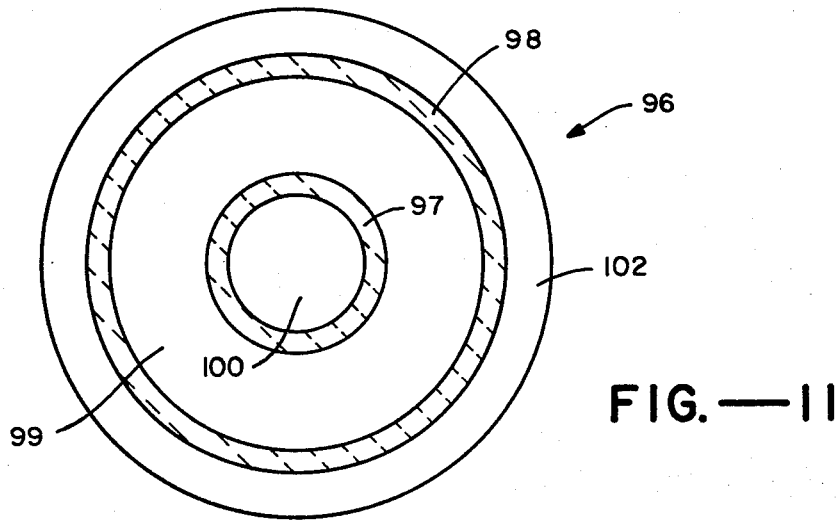
FIG.—11

MONITORING ARRANGEMENT UTILIZING FIBER OPTICS

BACKGROUND OF THE INVENTION

The present invention relates generally to monitoring devices and more particularly to a temperature monitoring arrangement which utilizes a fiber optic sensor. As will be seen this arrangement is especially suitable for sensing temperature changes in electrical transmission and distribution equipment, for example a generator, where strong electric and/or magnetic fields are present, or where the addition of metal lead wieres or sensors is undesirable.

Heretofore, it has not been common practice to monitor the temperature at particular points within an operating transformer or generator by direct measurement, that is, by sensing the temperature directly at or in close proximity to the coils and/or core of the transformer or inner workings of the generator. This has been primarily due to the fact that most montoring devices utilized in the past included metal sensors and/or wires and that such sensors and/or wires located within the particular apparatus could aversely affect the electric and magnetic field distribution therein, or because strong electromagnetic interference make transmission of information impossible.

As will be seen hereinafter, the present invention is directed to a monitoring arrangement, specifically a temperature monitoring arrangement in a preferred embodiment, and more specifically a temperature monitoring arrangement which utilizes a fiber optic sensor. As will also be seen, this sensor, in its preferred embodiment, consists essentially of at least one optical fiber and, hence, is in its entirety electrically nonconductive.

SUMMARY AND OBJECTS OF THE INVENTION

One object of the invention is to utilize certain inherent characteristics of optical fibers so that the fibers themselves can be utilized as sensors in a monitoring arrangement.

Another object of the present invention is to provide the monitoring arrangement, specifically the temperature monitoring arrangement in a preferred embodiment, utilizing a sensor including at least one optical fiber.

Still another object of the present invention is to provide a temperature monitoring arrangement which utilizes a temperature sensor consisting essentially of at least one optical fiber.

As will be discussed more fully hereinafter, applicants have found that the propagation and loss characteristics of optical fibers can be altered by temperature in several controlled ways and, hence, can be utilized in and by themselves as temperature sensors in an overall monitoring system or arrangement. For example, the guiding properties of an optical fiber can be destroyed by an appropriate variation in its indices of refraction as a result of a corresponding variation in its temperature. Less drastic but potentially useful variations in the attenuation of optical fibers are produced when the temperature affects the distribution of energy within the fiber. Propagation and loss characteristics can also be altered by providing bends in the fiber which, in turn, introduces light loss modulated by temperature. These bends in the fibers introduce loss, and change in the bending radius of the fiber, which is externally influenced by temperature, can also be used to measure temperature changes. Finally, coupling between adjacent fibers in the form of parallel fibers or concentric fibers can also be used as a basis for temperature monitoring.

As will be seen hereinafter, one such monitoring arrangement, constructed in accordance with the present invention, includes a temperature sensor, a light source and a light detector. In this embodiment, the temperature sensor includes, but preferably consists essentially of, at least one optical fiber having an inner core and a cladding extending concentrically around the core. Each of these latter components, that is the core and cladding, is constructed of a material (1) such that the difference between their respective indices of refraction varies with temperature, at least over a predetermined temperature range, and (2) such that the amount of light passing through the fiber varies with changes in this difference, so long as the index of refraction of the core is greater than that of the cladding. If the index of refraction of the cladding is greater, no light at all will pass through the fiber.

As stated above, the monitoring arrangement just recited also includes a light source and detector. The light source is provided for applying a predetermined amount of light into the optical fiber at a first predetermined point along it length (typically at one end) for passage towards a second predetermined point (typically at its other end). When the light reaches this latter point it is detected by means of the detector.

In another embodiment, as will also be seen hereinafter, an arrangement for monitoring temperature or possibly other conditions, includes an optical fiber sensor, a light source and a detector. In this embodiment, the optical fiber comprising part of the sensor, like the previously recited optical fiber, carries light from a first predetermined point along its length towards a second spaced apart predetermined point. However, this optical fiber includes a flexible curved section located between these points and is constructed such that the amount of light passing through the fiber from the first point to the second point, that is, along the flexible curved section, varies with changes in the radius of a curvature of the curved section, at least within a limited range. The sensor also includes means varying this radius of curvature in response to changes in the temperature being monitored or other such condition.

In still another embodiment to be described in more detail hereinafter, the temperature sensor includes at least two optical fibers, each of which is adapted to carry light along its length. One of these fibers is constructed such that some of the light passing therethrough is capable of passing out through the wall of the fiber by means of evanescent penetration, the amount of which varies with the temperature of the fiber. The second optical fiber includes at least a section which is positioned along and in sufficiently close proximity to a section of the first fiber for capturing at least some of the light passing out of the first fiber. This particular monitoring arrangement includes a light source for applying a predetermined amount of light into the first optical fiber and a detector for detecting the amount of light captured by the second fiber.

BRIEF DESCRIPTION OF THE DRAWINGS

FIG. 1 is an enlarged schematic illustration, in axial section, of an optical fiber of the type utilized in the monitoring arrangement of the present invention.

FIG. 2 is a graph which shows a specific relationship for the five lowest order optical fiber modes.

FIG. 3a is a schematic illustration of the penetration of a light wave beyond the physical boundary of the core of an optical fiber of the type illustrated in FIG. 1.

FIG. 3b is a schematic illustration of the intensity distribution of a guided light wave in an optical fiber of the type illustrated in FIG. 1, but near a bend rather than in its straight section as illustrated in FIG. 3a.

FIG. 4 is a schematic illustration of a temperature monitoring arrangement constructed in accordance with the present invention.

FIG. 5 is a graph which depicts the indices of refraction of certain materials in relation to temperature.

FIG. 6 is a graph illustrating power distribution for the lowest order modes in an optical fiber in relation to changes in the difference of the indices of refraction of the core and cladding materials which in turn varies with temperature.

FIG. 7a is a schematic illustration of a temperature monitoring arrangement constructed in accordance with another embodiment of the present invention.

FIG. 7b is a schematic illustration of a temperature monitoring arrangement constructed in accordance with still another embodiment of the present invention.

FIG. 7c is a schematic illustration of a temperature monitoring arrangement constructed in accordance with yet another embodiment of the present invention.

FIG. 8 is a schematic illustration of a further arrangement for monitoring temperature of possibly other conditions, constructed in accordance with the present invention.

FIG. 9a is a schematic illustration of a temperature monitoring arrangement which is constructed in accordance with the present invention and which utilizes two optically coupled fibers.

FIG. 9b is a modified temperature monitoring arrangement utilizing optical couplings.

FIG. 10 is a cross-sectional view of two adjacent optically coupled fibers adapted for use in a temperature monitoring arrangement of the optically coupled type.

FIG. 11 is a cross-sectional view of two concentric optically coupled guides adapted for use in a temperature monitoring arrangement of the optically coupled type.

DESCRIPTION OF THE PREFERRED EMBODIMENTS

Heretofore, research in developing optical fibers for communication applications has produced a large body of information about the propagation characteristics of fibers which is used in the monitors constructed in accordance with the present invention. The basic geometry of an optical fiber which is utilized by the monitors of the present invention is illustrated in cross-section in FIG. 1 and generally designated by the reference numeral 10. This optical fiber includes a dielectric core 12 constructed, for example, of glass or plastic, which is surrounded by a transparent material, again glass or plastic, having a lower refraction index. This latter component is commonly referred to as a cladding 14, and is itself surrounded by a third material 16, constructed of, for example, PVC (polyvinyl chloride) which acts as an abrasion protection jacket. A light beam is confined, or guided, in its propagation within the core, if the refracted index of the core is larger than the refractive index of the surrounding cladding. As long as the light beam is incident to the core surface at an angle greater than the critical angle, $\theta_c = \sin^{-1} n(\text{clad})/n(\text{core})$, the light will be totally internally reflected, i.e., guided.

When the core diameter is small, on the order of one or several wave lengths of light, only one or a few discrete modes of propagation can be supported by the fiber. The properties of these distinct modes will be functions of the light wavelength, the core radius, and the refractive indices of the core and cladding material. The propagation of any guided mode can be expressed in terms of an effective refractive index, n(eff), which lies between the core index $N_c$, and the cladding index, n. The relationship for the five lowest order fiber modes, between the refractive indices and the core radius, is illustrated in the graph of FIG. 2. There, "V" which is plotted along the abscissa, can be calculated by the equation:

$$V = AK(n_c^2 - n^2)^{\frac{1}{2}}$$

Where A is equal to the core radius, K equals $2\pi/\Lambda$, $\Lambda$ is the wavelength and $n_c$ and n are the indices of refraction of the core and cladding respectively, as stated above. The ordinate measures the value b which may be derived from the formula illustrated in the graph where $\beta/K$ is equal to n(eff) which, as previously stated, is the effective refraction index which lies between the core index $n_c$ and the cladding index n. For values of the parameter V less than 2.4, only the lowest order mode of the fiber can be supported. As the core radius becomes very large, so many modes can be supported that they may appear to be continuous rather than discrete.

Another important feature of the fiber light guides is the capability of the light wave to penetrate beyond the physical boundary of the core. This is best illustrated in FIG. 3a which shows the intensity distribution of light along the profile of optical fiber 10. A fraction of the light energy penetrates into the cladding region, in what is called the evanescent field. How the energy of this light is distributed between the core and the cladding will depend upon the mode and fiber parameters. The more weakly guiding the mode (the closer the mode is to cutoff), the greater will be the fraction of energy carried into the cladding. As will be seen hereinafter, this particular aspect of propagation and that discussed with respect to FIG. 2 are utilized to monitor temperature utilizing an optical fiber 10 as a temperature sensor.

Still another important fiber propagation characteristic is associated with optical losses at bends in the fiber. The intensity distribution of the guided light wave in the fiber near a bend is shown in FIG. 3b where there is illustrated a bent section 10' of an optical fiber. Again, some of the light energy resides in the evanescent field in the cladding, but at a critical distance $r_o$, the evanescent field "breaks away" into a radiation mode, and is lost to the guided mode. The physical reason for this breakaway is that the tangential velocity of the field at the point $r_o$ would have to exceed the velocity of light in the medium in order to keep up with the field in the core. Since it cannot do this, it is radiated away. The smaller the bending radius R, the greater will be the energy loss to radiation, and if the bend radius is sufficiently small, light cannot be guided at all because the rays strike the core boundary at less than the critical angle. The details of propagation of light in fibers is actually more complex than outlined here. However, these principles will be more than adequate for those with ordinary skill in the art to understand the application of optical fibers for the monitoring arrangements of the present invention to be described hereinafter.

The further propagation characteristic associated with optical fibers of the type illustrated again relates to the evanescent penetration of light beyond the boundary of the fiber core. More specifically, as will be discussed in more detail hereinafter, it is possible to make the thickness of the cladding sufficiently small such that the light penetrates beyond the cladding boundary. If another guide, that is, optical fiber, is located in this region, the light will penetrate into this second guide, where it may propagate as a guided mode. As will be discussed in more detail hereinafter, the amount of light energy that may be coupled from the first guide to the second guide will depend upon the spacing therebetween, the refractive indices of the material between them, and the length over which they run parallel. As will also be seen, not only can the indices of refraction be varied with temperature so as to provide a suitable temperature sensor, but it is quite possible to vary the spacing therebetween for purposes of temperature sensing.

The foregoing has been a brief and somewhat simplified discussion of the principles of fiber optic transmission. It has been provided so as to more fully understand the present invention but by no means is it considered a full and complete thesis on fiber optic transmission. However, as will be seen hereinafter, one with ordinary skill in the art to which the present invention pertains has sufficient knowledge in the art of fiber optics to understand the principles behind the present invention. As a result, a more detailed discussion of these principles would only complicate the description of the present invention and possibly confuse the reader.

Turning specifically to FIG. 4, attention is directed to a temperature monitoring arrangement which is generally designated by the reference numeral 20. As will be seen hereinafter, this particular monitoring arrangement utilizes the most obvious temperature sensitive parameters of an optical fiber which are the refractive indices of the fiber components, specifically its core and cladding. This monitor, as seen in FIG. 4, includes a continuous substantially straight optical fiber 22 which is identical to previously recited fiber 10 and hence includes an inner core and a cladding extending concentrically around this core. In accordance with the present invention, each of these components, that is, the core and cladding, is constructed of a material such that the difference between their respective indices of refraction ($n_c$ and $n$) varies with temperature, at least over a predetermined temperature range, and such that the amount of light passing through the fiber varies with the changes in this difference, so long as the index of refraction of the core is greater than that of the cladding. This latter requirement results from the fact that no light will pass through the fiber at all if the index of refraction of the cladding is greater than that of the core.

The optical fiber just described comprises at least a part of the temperature sensor of monitoring arrangement 20 and, in the embodiment illustrated, the temperature sensor consists essentially of this optical fiber. However, the overall monitoring arrangement also includes a light source 24 and a detector 26. The light may be of any conventional type, for example, a light emitting diode which emits a partial spectrum, or possibly individual wavelengths of light. The detector may also be of the conventional type, for example a PIN diode, and where necessary could be capable of differentiating between wavelengths. As illustrated in FIG. 4, light source 24 is positioned to apply a predetermined amount of light into the optical fiber at a first predetermined point along it length, for example at end 28. This light is directed towards a second predetermined point along its length, for example opposite end 30. The detector is positioned at this second predetermined point for detecting the amount of light which reaches it from end 28. This detector may include a conventional readout means, including visual means and/or possibly one which also includes a permanent recorder. In actual operation, at least a section of optical fiber 22 is positioned at the area to be monitored, for example within an electrical generator, transformer or the like, indicated generally at 32. As the temperature along the length of the optical fiber changes, the difference between the indices of refraction changes, thereby causing the amount of light to pass from source 24 to detector 26 to change in a predictable way. This, in turn, allows the temperature within apparatus 32 to be monitored.

As just stated, the important aspect of monitoring apparatus 20 resides in the responsive change in the indices of refraction of the fiber components as a result of changes in the temperature. Thus, an important consideration for any temperature monitor mechanism based upon the temperature induced change of refractive index is the magnitude of the index change to be expected. Table I is a compilation of data on the temperature coefficients of refractive index of several Schott glasses, and fused silica, the most commonly used base material of high quality optical fibers. It is significant that dn/dT may be either positive of negative, and that its magnitude ranges over a factor of about 75. Fused silica is one of the more temperature sensitive glasses. As an example, a temperature change of 300° C. produces an index change of $3 \times 10^{-3}$, which can lead to easily observed effects in optical fibers.

TABLE I

| TEMPERATURE COEFFICIENTS OF REFRACTIVE INDEX | |
|---|---|
| Glass Type | dn/dT ($\times 10^{-6}$) at 100° C. |
| Fused Silica | 10 |
| PK50 | −1.2 |
| PSK53 | −3.6 |
| TLF1 | −1.46 |
| TLF2 | −0.14 |
| TLF3 | −2.14 |
| TLF5 | −0.17 |
| TLF6 | −5.54 |
| SF11 | 10.36 |
| SF13 | 9.66 |
| SF14 | 8.79 |
| SF57 | 10.14 |
| SF59 | 13.02 |
| BaF50 | 0.78 |
| SK15 | 1.1 |
| Index Changes for dn/dT = $10^{-5}$/° C. | |
| $\nabla T$ | $\nabla n$ |
| 10° C. | $10^{-4}$ |
| 100° C. | $10^{-3}$ |
| 300° C. | $3 \times 10^{-3}$ |
| 600° C. | $6 \times 10^{-3}$ |

One specific way of utilizing monitor 20 is based upon choosing the core and cladding materials with a different temperature coefficient of refractive index, such that the indices become identical at some temperature and actually cross over beyond that temperature. Beyond the cross over temperature, the cladding index becomes larger than the core index, and the core will no longer act as a light guide. In this manner, the monitoring arrangement acts as an "on-off indicator". At low temperature, light will be transmitted from the light source 24 to the detector 26 but if the temperature rises to the cross over point anywhere along the fiber, the light transmission would cease. While this type of monitor is somewhat uncomplicated in principle, it does have one drawback. Specifically, it may be difficult to find compatible core and cladding materials, of suitable optical quality, with an index cross over in a temperature region of interest. A survey of the Schott glasses yielded three pairs, with temperature cross overs at 250° C., 350° C. and 450° C. Graphs of the refractive indices v. temperature are shown in FIG. 4 for these three pair of glasses.

The difficulty in choosing core and cladding materials for cross over, as just discussed, can be eliminated in a concept in which temperature determination is made by sensing the distribution of light energy carried in the core and cladding rather than by means of cross over. Optical fibers are generally fabricated with core materials which have absorption and scattering losses as low as possible, so that light may be guided for long distances. Since there is evanescent penetration of the light into the cladding, losses may also occur in the cladding, as well as the core. Sometimes, the cladding is intentionally made lossy as a "mode stripper", in which the higher order modes are greatly attenuated, since they penetrate deeper into the cladding. How great this loss is will depend upon the loss constants of the cladding material and the power distribution ratio, P(clad)/P(total). If the cladding is thin enough, the light penetration can extend to the cladding-jacket interface, and loss may occur at the jacket. In any case, the power distribution ratio is given by:

$$\frac{P_{clad}}{P_T} = \frac{a^2 k^2 [n_c^2 - (\beta/k)^2]}{v^2} \sqrt{\frac{1}{a^2 k^2 b 2 n \Delta n + l^2 + 1}}$$

where:
$n_c$ = core index
$n$ = cladding index
$a$ = core radius
$k = 2\pi/\lambda$
$\lambda$ = light wavelength
$\beta$ = mode propagation constant
$v = ak(2n\Delta n)^{\frac{1}{2}}$ $$b = \frac{(\beta/k - n)}{\Delta n}$$

$l$ = mode index number

In the equation just recited, it can be seen that the power distribution ratio is dependent on the indices of refraction of the core and cladding of optical fiber 10. Accordingly, it is dependent on temperature and hence measures temperature as discussed previously. FIG. 6 shows this power distribution for the lowest order fiber mode as a function of core-cladding index difference $\Delta N$, when core radii range from two micrometers to one hundred micrometers. In order to use this effect as a temperature monitor, the core radius in the index difference $\Delta N$ would be chosen so that P(clad)/P(t) lies on a steeply changing portion of the curve. Then, if the cladding or the jacket is lossy, a large change in transmission of this mode will result if $\Delta N$ is changed with temperature. Only the power distribution for the lowest order mode is shown in FIG. 6. When the core radius is large enough, higher modes will be present. In that case, it is necessary to take into account all of the modes that can be supported by the fibers. Suppose, for example, that a core radius of 10 micrometers is chosen, then for $\Delta N$ up to $10^{-3}$, as many as four modes can be supported.

As stated previously, there is a varying amount of light loss resulting from the bend in an optical fiber such as fiber 10 and that this bending loss can be used advantageously to monitor temperature since it can be extremely sensitive to small changes in certain relevant parameters. As also stated previously, any fiber of the described type can be made to cease transmitting entirely by bending it sharply enough. How small the bend radius must be in order for the loss to be appreciable will depend upon the light wavelength and fiber parameters according to the following relation:

$$\alpha = 2 \frac{\beta^2 - n^2 k^2}{n_c k} \exp\left[ -\frac{2}{3} n_c k R \left[ \frac{\beta^2 - n^2 k^2}{} - \frac{2a}{R} \right]^{3/2} \right]$$

Where R is the bending radius, and the other quantities have been previously defined. From this relation, it can be seen that the change in bend loss can be used to measure temperature if either the core or cladding indices, or bending radius, change with temperature. However, this expression gives the loss only for the one mode whose propagation constant is $\beta$, so that for a multimode fiber the loss of each mode is separately caculated, and summed to give the total loss. In general, only the modes very near cutoff will have an appreciable loss, so the best temperature sensitivity will be attained in a single mode fiber monitor.

Having briefly described the principle behind monitoring temperature using the bending loss of fiber, attention is specifically directed to FIGS. 7a, 7b and 7c which illustrate three different embodiments of a temperature monitoring arrangement similar to the previously described monitoring arrangement 20 illustrated in FIG. 4. In FIG. 7a, the monitor, which is generally designated as 36, includes an optical fiber 38 wrapped with a constant bend radius R around a cylindrical core 40, preferably one which is electrically nonconductive. More specifically, optical fiber 38 curves along a helical path, making a plurality of turns, from one end of core 40 to the other. A light source 42, which may be identical to previously recited light source 24, is located at one end of the fiber while a detector 44, which may be identical to previously recited detector 26, is located at the other end of the fiber. The source is of course provided for directing light through the optical fiber towards the detector. The detector is provided to detect and monitor the amount of light passing thereto.

An important aspect of the particular embodiment just described is that the constant bend radius R is chosen so that the total bending loss is not too high, and yet such that the sensitivity of the fiber to temperature changes along its bend, especially in small regions, is adequate. More specifically, from the previously recited relationship, it can be seen that a large bend radius R tends to provide low insertion loss but also relatively low sensitivity whereas a small bend radius (a sharp bend) providing high sensitivity also results in a large bending loss. Accordingly, the particular bend radius R selected for the embodiment illustrated in FIG. 7a should be a compromise between these two extremes.

In the event it is not practical to make the compromise just recited, the overall insertion loss can be reduced without adversely affecting sensitivity to any significant degree by winding the fiber tightly over short regions which are then connected to one another by sections of straight fiber. This is illustrated in the embodiment shown in FIG. 7b which is generally designated by the reference numeral 46. Note that the optical fiber, generally designated at 48, like fiber 38 extends around an identical core. However, in arrangement 46, fiber 48 includes a plurality of straight sections 52 which are interconnected by sharp turns, actually one or more helical turns 54 which, of course, would be sensitive areas (and also high loss areas) of the fiber. However, since these sensitive sections are connected by sections in which the bend loss is essentially zero, very long lengths may have low optical loss even though the radius of curvature in the sensitive regions are small enough to produce good sensitivity to temperature changes. Of course, this embodiment will also include a light source and detector which, for convenience, will also be designated by the reference numerals 42 and 44.

Another embodiment functionally similar to that illustrated in FIG. 7b is illustrated in FIG. 7c. There, the arrangement generally designated at 60 includes an optical fiber 62 including a plurality of relatively straight section 64 interconnected by relatively short but sharply curved intermediate section 66. However, these latter sharply curved sections, rather than being single helical turns, lie in a common plane. This may be accomplished by applying the entire fiber to one side of a plate 68 having intermediate raised sections or dimples 69 having carefully controlled radii to give the desired sensitivity to temperature. Arrangement 60 of course also includes a light source 42 and detector 44.

Each of the three arrangements just described can be utilized for monitoring the internal temperature in a generator, transformer or the like, as indicated at 32. The advantages in the embodiments illustrated in FIGS. 7b and 7c as compared to that of FIG. 7a, is that the sensing areas can be localized, specifically at the sharp bends, whereas this cannot be done with the continuous curvature of fiber 38. Moreover, with regard to the latter two embodiments, where it is desirable to monitor a single isolated location, either fiber 48 or fiber 62, will include only one turned section or sharp bend. While it is true that the straight sections of this particular type of configuration continues to respond to temperature, as is the case in the embodiment illustrated in FIG. 4, the sensitivity of the turned section or sharp bend is so much higher than that of the straight section comparatively speaking that changes in the light propagation resulting from the straight sections can be ignored compared to the changes in light propagation resulting from the sharp turn or bend.

The temperature monitoring arrangements 36, 46 and 60 just described rely on changes in the indices of refraction of their respective optical fiber sensors for testing temperature directly. In all three cases, the radius of a curvature in each was fixed. As a result, while this factor was at least in part responsible for establishing the level of sensitivity and light loss it did not vary, once established. However, it should be readily apparent from the previously recited relation between $\alpha$, the bending loss, and the radius of curvature R that $\alpha$ does in fact vary with the radius of curvature. Accordingly, the radius of curvature R could be used in and by itself, apart from the indices of refraction of the fiber to sense the particular condition, specifically the temperature.

This is best illustrated in FIG. 8 by temperature monitoring arrangement 70 as illustrated. The arrangement of course includes the light source and detector 42 and 44 respectively located at opposite ends of an optical fiber 72. The fiber can be identical to the previously recited fibers, with one exception. Fiber 72 must itself be flexible or at least include a flexible section generally designated at 74, whereas the previously recited fibers do not have to be flexible but may be rigid throughout their entire lengths. As illustrated in FIG. 8, flexible section 74 is flexibly held by means of adhesive (not shown) or the like to one side of a dielectric element 76 or other suitable means which expands and contract or otherwise moves in response to temperature changes. This dielectric element is comprised of, for example, a layer of TEFLON (trademark) and a laminated layer of PVC, generally designated at 78 and 80.

In the embodiment just described, as the dielectric element changes in temperature it will either contract or expand causing its radius of curvature to either decrease or increase thereby altering the radius of curvature of flexible fiber section 74 in a similar way. This will in turn alter the propagation of light through the section in accordance with the previously recited relationship so that the temperature changes causing the changes in the radius of curvature can be sensed. Where the temperature being sensed is generalized relative to a dielectric plate and flexible fiber section, it should be apparent that changes in the temperature will not only change the radius of curvature of the fiber but also its indices of refraction. However, in most cases the sensitivity resulting from the changes in the radius of the curvature are so much greater than the sensitivity resulting from changes in the indices of refraction that the latter can be ignored. However, if this is not the case, the flexible fiber section can be readily insulated so as not to respond to temperature changes at all.

Arrangement 70 has been described as a temperature monitoring arrangement. It should be apparent that the bending radius of the fiber section could be controlled in other ways so as to respond to other types of conditional changes. For example, the dielectric plate could be mechanically linked to a mechanical device which changes with a particular condition, for example a float valve in a level detector, so that the dielectric plate expands and contracts depending upon the position of the float valve.

In all of the various embodiments thus far described, the question of interpretation arises when very large drops in the transmission of the fiber occurs, causing no light to reach the detector at all. This condition could indeed indicate a steep temperature rise, either causing the index of refraction of the fiber cladding to become larger than the index of refraction of the core or causing the bend radius to decrease a sufficient amount for preventing light from passing through. However, it might also indicate a break in the fiber. Accordingly, any of the embodiments just described may incorporate internal checks. One method of accomplishing this is to transmit multiple wavelengths through the fiber, as in all of the cases thus far described, the light propagation is dependent upon wavelength. In any of these embodiments, the particular wavelength which is not likely to be cut off within the extremes of the condition being monitored, specifically for example within the extreme temperature ranges to be encountered, can be readily selected. Accordingly, should the detector of the given arrangement cease to detect that particular wavelength of light, this would most probably indicate a break in the fiber as opposed to a sharp change in temperature. Those with ordinary skill in the art could readily provide both a source and detector for furnishing and detecting as well as distinguishing light of different wavelengths and light of a particular wavelength.

In the embodiment thus far discussed, each arrangement utilized a heat sensor consisting essentially of a single optical fiber. However, as stated previously, the temperature monitoring arrangement can be based on coupling between optical fibers. More specifically, as a result of the evanescent penetration of light beyond the boundary of the fiber core, as discussed previously, it is possible to make the thickness of the cladding sufficiently small that the light penetrates beyond the cladding boundary. If another optical fiber is located in this region, where it may propagate as a light guided mode. The amount of light energy that may be coupled from the first to the second fiber will depend upon the spacing therebetween, the refractive indices of the material between them, and the length over which they run parallel. There is no limit as to how much the light from the first fiber may be transferred to the second, in fact, all the light may be exchanged back and forth between the two. The amount of coupling between two parallel guides will be a function of the guide transmission, the various refractive indices, and the separation therebetween. Generally, the ratio of optical power coupled from one guide or fiber into the second guide or fiber, in a length L, is given by the expression:

$$V(L,\Delta\beta) = (L\Delta\beta)^2$$

which $L|\Delta\beta| << |$. $\Delta\beta$ is the perturbation of the propagation constant of the light in the first guide caused by the presence of the second guide. Calculations of this perturbation are very complex for all but the simplest geometries, but are available in the literature and can be readily calculated by those with skill in the art.

As stated previously, the coupling of light from one fiber to a parallel one can be used to monitor temperature, since the amount of coupling, which is dependent upon the refractive indices of the fibers and of the dielectric spacer between them, and upon spacing between the fibers, can be made to vary with temperature. FIG. 9a illustrates schematically one such monitoring arrangement. As shown in this figure, an arrangement generally designated at 80 is illustrated and may be provided for monitoring the temperature in previously recited apparatus 32. Arrangement 80 includes a first optical fiber 82 which is adapted to carry light from a first predetermined point, for example its end 84 towards a second spaced apart predetermined point, for example its other end 86. This fiber is constructed such that some of the light passing therethrough is capable of passing through its outer wall or cladding by means of evanescent penetration, the amount varying with the temperature of the fiber along its length. The arrangement also includes a second optical fiber 88 for carrying light along its length. At least a section of this fiber is positioned along and in sufficiently close proximity to a section of this first fiber, between the first and second points, for capturing at least some of the light passing out of the first fiber. The light source 42 is positioned adjacent point 84 for applying a predetermined amount of light into the first optical fiber, that is, fiber 82, for passage towards the second point 86. The detector 44 is positioned at a predetermined point along the length of the second fiber, that is, fiber 88, for detecting the amount of light captured by the second fiber.

In the embodiment just described, a change in temperature anywhere along the length of the two parallel guides will cause a change in coupling and consequently a change in the intensity of the light at the detector. The difficulty with this configuration is that it may not be possible to choose parameters such that there will be good sensitivity to temperature change in a small region (say 10 centimeters long) without having excessively large coupling over the entire length of the fiber. This difficulty may be avoided by the configuration shown in FIG. 9b. There, the arrangement, which is generally designated by the reference numeral 80', includes a first fiber 82 and associated light source 42. However, a plurality of second optical fibers 88' are provided in place of the single fiber 88. Each of these individual fibers are coupled to main fiber 82, each is of a relatively short length, and each has a detector 44 associated therewith. In this manner, the temperature may be monitored along relatively short sections of the main fiber, thereby achieving good sensitivity to temperature change, with only a small amount of light being removed from the main guide over its entire length. Moreover, an additional advantage is that the location of temperature change may be specified.

The most obvious geometry to consider for a coupled guide monitor consists of two closely spaced fibers. Other geometries are also possible, such as two planar guides. A possible manufacturing problem might lie in the difficulty of maintaining close spacing tolerances over long lengths. By asymetric deposition of the core reaction products in fabricating the preform used to draw the final fiber, it would be possible to create a finished fiber with two cores closely spaced and separated by a common cladding. The separation of these cores would be adjusted during manufacture so that the temperature induced changes in refractive index would be sufficient to change the coupling between the fibers. This double fiber could be used either as a continuous monitor or a point monitor. In the latter case, the sensitive regions of the fiber would created by "necking down" the fiber to create regions where the two cores approach one another more closely than in the rest of the fiber. The cross section of such a fiber is illustrated in FIG. 10 generally designated by the reference numeral 90. The cores are indicated at 92 and the common cladding is indicated at 94. The configuration utilizing only a single fiber, in which it would be less complicated to maintain tolerances is illustrated in FIG. 11, generally designated by the reference numeral 96. There, two guide cores 97 and 98 are fabricated in a coaxial fashion, with carefully controlled separation therebetween, so that light may be coupled from one core to the other in response to changes in the various refractive indices. The respective cores are separated by an intermediate cladding 99. Moreover, the inner core includes an inner cladding 100 and the outer core includes an outer cladding 102. It is possible by already developed methods in the fiber manufacturing technology to fabricate very complex fiber profiles by methods of light fusion and chemical vapor deposition. This coaxial geometry essentially adapts two coupled planar guides into an easily fabricated single fiber.

A significant advantage of the two core, two fiber, or coaxial fiber approach as discussed above is that hot spot locations can be accomplished by utilizing short light pulses in one of the fibers and by measuring the time of arrival of the light in the other fiber. Resolution of ten centimeters can be obtained easily with a one ns pulsed source.

Coupled light guide monitors may be driven by mechanical changes produced by temperature changes as well as refracted indices. For example, thermal expansion may change inner guide spacing, and this will cause a change in the coupling constant. Moreover, the fiber jacketing material (not shown) could contain regions which would enhance bending loss at specific temperatures. For example, a corrugated material which undergoes a phase change could be used to preferentially bend the fiber at a given temperature.

What is claimed is:

1. A temperature monitoring arrangement, comprising:
    (a) a temperature sensor including at least one optical fiber having an inner core and a cladding extending concentrically around said core, said core and cladding each being constructed of a material such that
        (i) the difference between their respective indices of refraction varies with temperature, at least over a predetermined temperature range, and
        (ii) the amount of light passing through said fiber varies with changes in said difference so long as the index of refraction of said core is greater than that of the cladding;
    (b) light source means for applying a predetermined amount of light into said optical fiber at a first predetermined point along its length for passage towards a second predetermined point along its length; and
    (c) means for detecting the amount of light reaching said second point from said first point.

2. A monitoring arrangement according to claim 1 wherein said heat sensor consists essentially of at least one of said optical fibers.

3. A monitoring arrangement according to claim 1 wherein said detecting means includes readout means calibrated to display any changes in temperature of said fiber, at least over a fixed temperature range.

4. A monitoring arrangement according to claim 1 wherein said light from said light source means includes light of one predetermined wavelength and wherein said detecting means includes means for detecting light of only said wavelength.

5. A monitoring arrangement according to claim 1 wherein said light from said light source means includes light having a plurality of predetermined wavelengths and wherein said detecting means includes means for detecting light of different wavelengths and for distinguishing therebetween.

6. A monitoring arrangement according to claim 1 wherein said optical fiber includes at least one curved section located between said first and second predetermined points, said section having a fixed, predetermined radius of curvature which is sufficiently large to allow some of said light to pass from said first point to said second point.

7. A monitoring arrangement according to claim 6 wherein said curved section defines a continuous helical path making a plurality of turns.

8. A monitoring arrangement according to claim 6 wherein said optical fiber includes a plurality of said curved sections, said sections being spaced from one another by substantially straight sections of said fiber.

9. A monitoring arrangement according to claim 7 wherein each of said curved sections defines a helical path having at least one turn.

10. A monitoring arrangement according to claim 1 wherein said optical fiber includes at least one flexible curved section located between said first and second points, said sensor also including fiber support means which moves in a predetermined way in response to changes in temperature, said support means being connected with said flexible curved section of said optical fiber for varying the radius of curvature of said section during said movement.

11. An arrangement for monitoring a particular condition, comprising:
    (a) a sensor including
        (i) an optical fiber adapted to carry light from a first predetermined point along its length to a second spaced apart predetermined point, said fiber including a flexible curved section located between said points, said fiber being constructed such that the amount of light passing through said fiber from said first point to said second point varies with changes in the radius of curvature of said curved section, at least within a limited range; and
        (ii) means for varying said radius of curvature in response to changes in said condition;
    (b) light source means for applying a predetermined amount of light into said optical fiber at a first predetermined point along its length for passage towards a second predetermined point along its length; and
    (c) means for detecting the amount of light reaching said second point from said first point.

12. An arrangement according to claim 11 wherein said condition is temperature.

13. An arrangement according to claim 12 wherein said varying means includes fiber support means which expands and contracts in a predetermined way in response to changes in temperature, said support being connected with said flexible curved section of said optical fiber for varying the radius of curvature of said sections during said expansion and contraction.

14. A temperature monitoring arrangement, comprising:
    (a) a temperature sensor including
        (i) a first optical fiber adapted to carry light from a first predetermined point along its length to a second predetermined point, said optical fiber being constructed such that some of said light is capable of passing out through the wall of said fiber by means of evanescent penetration, the amount of which varies with the temperature of said fiber between said points, and
        (ii) a second optical fiber adapted to carry light along its length, at least a section of said second fiber being positioned along and in sufficiently close proximity to a section of said first fiber, between said first and second points, for capturing at least some of said light passing out of said first fiber along said section thereof;
    (b) light source means for applying a predetermined amount of light into said first optical fiber at said first predetermined point along its length; and
    (c) means for detecting the amount of light captured by said second fiber from said first fiber.

15. An arrangement according to claim 14 wherein said sections of said fibers are positioned in side-by-side parallel relationship to one another.

16. An arrangement according to claim 14 wherein said sensor includes a plurality of second fibers, each of which is positioned along and in sufficiently close proximity to a distinct section of said first fiber, between said first and second points, for capturing at least some of said light passing out of said first fiber.

17. An arrangement according to claim 14 wherein said section of said second fiber is positioned concentrically around said first fiber.

18. An arrangement according to claim 17 wherein at least one segment of said second fiber section is radially closer to said first fiber than the rest of said second fiber section.

* * * * *